US007517281B2

(12) United States Patent
Baerlocher

(10) Patent No.: US 7,517,281 B2

(45) Date of Patent: Apr. 14, 2009

(54) GAMING DEVICE HAVING A BONUS SCHEME WITH MULTIPLE POTENTIAL AWARD SETS

(75) Inventor: Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 946 days.

(21) Appl. No.: 10/949,088

(22) Filed: Sep. 24, 2004

(65) Prior Publication Data

US 2005/0037840 A1 Feb. 17, 2005

Related U.S. Application Data

(63) Continuation of application No. 09/822,697, filed on Mar. 30, 2001, now Pat. No. 6,796,899.

(51) Int. Cl.
*A63F 13/00* (2006.01)

(52) U.S. Cl. .......................................... 463/25; 463/20

(58) Field of Classification Search .................. 463/16, 463/20, 25

See application file for complete search history.

(56) References Cited

U.S. PATENT DOCUMENTS

| | | | | |
|---|---|---|---|---|
| 4,560,161 | A | | 12/1985 | Hamano |
| 4,695,053 | A | | 9/1987 | Vazquez, Jr. et al. |
| 5,205,555 | A | | 4/1993 | Hamano |
| 5,342,047 | A | | 8/1994 | Heidel et al. |
| 5,449,173 | A | | 9/1995 | Thomas et al. |
| 5,536,016 | A | | 7/1996 | Thompson |
| 5,772,509 | A | | 6/1998 | Weiss |
| 5,788,573 | A | | 8/1998 | Baerlocher et al. |
| 5,848,932 | A | * | 12/1998 | Adams ........................ 463/20 |
| 5,902,184 | A | | 5/1999 | Bennett |
| 5,938,200 | A | | 8/1999 | Markowicz et al. |
| 5,947,820 | A | | 9/1999 | Morro et al. |
| 5,951,397 | A | | 9/1999 | Dickinson |
| 5,976,015 | A | | 11/1999 | Seelig et al. |
| 5,997,400 | A | | 12/1999 | Seelig et al. |
| 6,015,346 | A | | 1/2000 | Bennett |
| 6,056,642 | A | | 5/2000 | Bennett |
| 6,089,976 | A | | 7/2000 | Schneider et al. |
| 6,102,798 | A | | 8/2000 | Bennett |
| 6,117,009 | A | | 9/2000 | Yoseloff |
| 6,120,377 | A | * | 9/2000 | McGinnis et al. ............. 463/20 |
| 6,126,542 | A | | 10/2000 | Fier |
| 6,159,098 | A | | 12/2000 | Slomiany et al. |
| 6,162,121 | A | | 12/2000 | Morro et al. |
| 6,168,520 | B1 | | 1/2001 | Baerlocher et al. |
| 6,168,523 | B1 | | 1/2001 | Piechowiak et al. |
| 6,173,955 | B1 | | 1/2001 | Perrie et al. |
| 6,174,235 | B1 | | 1/2001 | Walker et al. |
| 6,190,255 | B1 | | 2/2001 | Thomas et al. |

(Continued)

*Primary Examiner*—Ronlad Laneau
*Assistant Examiner*—Tramar Harper
(74) *Attorney, Agent, or Firm*—K & L Gates LLP

(57) ABSTRACT

A gaming device and a method for operating the gaming device. The gaming device includes a processor, a display device adapted to communicate with the processor, several sets displayed by a display device and at least one component associated with each set. Several selections are displayed by the display device and a prize is awarded to a player when a set is completed. A player completes a set and receives a prize for that set when the player picks selections and generates each component associated with a set.

10 Claims, 16 Drawing Sheets

U.S. PATENT DOCUMENTS

| | | | | |
|---|---|---|---|---|
| 6,203,429 | B1 | 3/2001 | Demar et al. | |
| 6,224,482 | B1 | 5/2001 | Bennett | |
| 6,315,664 | B1 | 11/2001 | Baerlocher et al. | |
| 6,319,124 | B1 | 11/2001 | Baerlocher et al. | |
| 6,346,043 | B1 | 2/2002 | Colin et al. | |
| 6,347,996 | B1 | 2/2002 | Gilmore et al. | |
| 6,428,412 | B1 * | 8/2002 | Anderson et al. | 463/9 |
| 6,609,973 | B1 * | 8/2003 | Weiss | 463/20 |
| 6,685,561 | B2 | 2/2004 | Anderson et al. | |
| 6,899,618 | B2 | 5/2005 | Colin et al. | |
| 2002/0052232 | A1 * | 5/2002 | Kaminkow | 463/20 |
| 2004/0204229 | A1 * | 10/2004 | Walker et al. | 463/20 |

* cited by examiner

FIG.13

120 118 122

| AWARD | PROBABILITY |
|---|---|
| 5 | 5 % |
| 10 | 10 % |
| 15 | 20 % |
| 20 | 20 % |
| 25 | 20 % |
| 30 | 10 % |
| 35 | 10 % |
| 40 | 5 % |
| TOTAL | 100 % |

FIG.14

128 124 126

| SET | PROBABILITY |
|---|---|
| A | 40.00% |
| B | 40.00% |
| A&B | 20.00% |
| | 100.00% |

GAMING DEVICE HAVING A BONUS SCHEME WITH MULTIPLE POTENTIAL AWARD SETS

PRIORITY CLAIM

This application is a continuation of, claims priority to and claims the benefit of U.S. patent application Ser. No. 09/822,697, filed on Mar. 30, 2001 now U.S. Pat. No. 6,796,899, the entire contents of which are incorporated herein.

CROSS REFERENCE TO RELATED APPLICATIONS

This application is related to the following commonly-owned patent applications: "GAMING DEVICE HAVING A BONUS SCHEME WITH MULTIPLE SELECTION GROUPS," Ser. No. 09/656,702, now U.S. Pat. No. 6,439,995; "GAMING DEVICE WITH BONUS SCHEME PROVIDING INCREASED REWARD FOR SELECTING RELATED SYMBOLS," Ser. No. 09/605,023, now U.S. Pat. No. 6,669,559; "GAMING DEVICE HAVING A MULTIPLE SELECTION GROUP BONUS ROUND," Ser. No. 09/605,107, now U.S. Patent No. 6,511,375; "GAMING DEVICE HAVING A MULTIPLE SELECTION SET BONUS SCHEME," Ser. No. 09/680,592, now U.S. Pat. No. 6,602,135; "GAMING DEVICE HAVING A BONUS SCHEME INCLUDING A PLURALITY OF SELECTION GROUPS WITH WIN-GROUP OUTCOMES," Ser. No. 09/981,084, now U.S. Pat. No. 6,932,701; "APPARATUS AND METHOD FOR MODIFYING GENERATED VALUES TO DETERMINE AN AWARD IN A GAMING DEVICE," Ser. No. 09/957,018, "GAMING DEVICE HAVING A BONUS SCHEME WITH MULTIPLE POTENTIAL AWARD SETS," Ser. No. 09/822,697, now U.S. Pat. No. 6,796,899; "GAMING DEVICE HAVING A BONUS SCHEME WITH MULTIPLE SELECTION GROUPS," Ser. No. 10/195,292, now U.S. Pat. No. 6,595,854; "GAMING DEVICE HAVING A BONUS SCHEME WITH MULTIPLE SELECTION GROUPS," Ser. No. 10/243,047, now U.S. Pat. No. 7,273,415; "GAMING DEVICE HAVING A MULTIPLE SELECTION GROUP BONUS ROUND," Ser. No. 10/327,538, now U.S. Pat. No. 7,303,469; "GAMING DEVICE HAVING A BONUS SCHEME WITH MULTIPLE POTENTIAL AWARDS SETS," Ser. No. 10/652,457, "GAMING DEVICE HAVING A BONUS SCHEME WITH MULTIPLE SELECTION GROUPS," Ser. No. 10/623,421, now U.S. Pat. NO. 7,182,689; "GAMING DEVICE HAVING A MULTIPLE SELECTION SET BONUS SCHEME," Ser. No. 10/607,663, now U.S. Pat. No. 6,863,607; "GAMING DEVICE HAVING A CHANGING MULTIPLE SELECTION SET BONUS SCHEME," Ser. No. 10/458,445, now U.S. Pat. No. 6,817,943; "GAMING DEVICE WITH BONUS SCHEME PROVIDING INCREASED REWARD FOR SELECTING RELATED SYMBOLS," Ser. No. 10/690,305, now U.S. Pat. No. 6,878,061; "GAMING DEVICE HAVING A PLAYER SELECTION GAME," Ser. No. 10/954,132, "GAMING DEVICE HAVING A CHANGING MULTIPLE SELECTION SET BONUS SCHEME," Ser. No. 10/977,672, and "GAMING DEVICE HAVING A PLURALITY OF SYMBOL GENERATORS AND ACCUMULATION GAME WITH MULTIPLE INDEPENDENT TERMINATING CONDITIONS," Ser. No. 10/941,485.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having a bonus scheme including multiple potential award sets, wherein the player obtains an award associated with one of the award sets.

BACKGROUND OF THE INVENTION

Primary and secondary games in gaming machines generally result in a win or a loss for the player. In a slot machine game, the game ends when the reels stop and the gaming device analyzes the symbol combinations to determine if one or more winning outcomes exist. In a poker game, the game randomly deals cards, the player has one or more opportunities to randomly generate one or more new cards and the player wins or loses based on a final combination of cards. In a blackjack game, the player's card values add until the player's hand beats the dealer's hand, loses to the dealer's hand or busts.

In each of these well known games, the game ends after a number of random generations. In slot machines, the basic game ends after one random generation. In poker machines, the game ends after one, two or more random generations, depending on the type of poker game. In blackjack machines, the number of generations varies, but has a limit, namely, the number until the card denominations add to or exceed twenty one.

Known bonus games employ a plurality of game ending strategies. One known strategy is a do-until strategy in which the player picks until picking a bonus terminator. European Patent Application No. EP 0 945 837 A2 filed on Mar. 18, 1999 and assigned on its face to WMS Gaming, Inc. discloses a bonus game in which a player has one or more opportunities to select masked bonus awards. When the player selects a masked award, the game reveals the selection and provides the award to the player. The player selects until all the selections are selected or until selecting a game terminator. In other games, the player selects from a group of selections until two or more matching selections are picked by the player.

Another known bonus game ending strategy includes letting the player decide whether to end the game with a particular result or trade results with the hope of obtaining a higher award. The TOP DOLLAR® gaming device, which is manufactured and distributed by the assignee of this application, provides the player with three offers and a final award. When an offer is given, the player may accept or reject it. If the player accepts an offer, the player receives the accepted bonus amount and the bonus round terminates. If the player declines an offer, the game generates another offer for the player, which may be a higher or lower award. The game is similar to poker, wherein the player has a limited opportunity to better an outcome.

In each of the foregoing games, the game ends upon a limited number of random generations or upon a result of the random generations. In an effort to create a more entertaining and exciting game, a need exists to create a gaming machine or device having new apparatus and method for ending a game and combine these with the known methods described above.

SUMMARY OF THE INVENTION

The present invention provides a gaming device and in particular a bonus scheme of a gaming device that enables players to accumulate awards in a plurality of sets until one of the sets is completed. Each set includes at least one and preferably a plurality of components. The gaming device enables a player to pick a plurality of selections from a group of masked selections. Preferably, a component from one of the sets is associated with each selection. A component from two or more of, or each of the sets, could also be associated with a selection.

In the preferred embodiment, the components of a set include values, modifiers and bonuses; however, it should be appreciated that other components could be part of or associated with a set or a plurality of sets in addition to or in place of the values, modifiers and bonuses. At least one and preferably a plurality of designated or predetermined components are necessary to complete a set. For instance, in the preferred embodiment, each set has a plurality of value components. To complete such set, all of the value components in such set must be obtained or selected by the player. It should be appreciated that the number of or type of components in each set necessary to complete the set may vary and that the components necessary to terminate each set is preferably, but does not have to be, identical or similar. For example, a bonus component may be required to complete one of the sets.

Each component preferably has a symbol or other identifier associated with the component, and particularly the value components or the components necessary to complete a set. Thus, when the player picks one of the selections from the group of masked selections (which the game preferably simultaneously displays to the player), the game reveals the value and the identifier or symbol associated with one of the sets (i.e., to identify the component of the appropriate set). In one embodiment of the invention, an identifier or symbol is associated with a selection before a player picks from the group of masked selections. In another embodiment, the player picks the selection and then the symbol or identifier is associated with the selection before revealing the selection to the player. It should also be appreciated that the processor of the gaming device could randomly determine the selections. In accord with one aspect of the invention, the components are weighted such that the processor is more likely to assign one component to a selection over another component.

The player preferably receives the award associated with the first set completed; however, the player could receive an award from another completed set, such as the last set completed or from an uncompleted set. The award provided to the player is preferably based on the components of the appropriate set, such as the first set completed in the preferred embodiment. In the preferred embodiment, the award provided to the player includes the sum of the value components achieved, modified by any modifiers such as a multiplier (if any modifiers are obtained before the first set is completed) and the addition of any bonuses (if any bonuses are obtained before the first set is completed).

As indicated above, another aspect of the invention includes bonuses or bonus credits which are associated with the selections. If a player picks a selection and generates a bonus, the bonus is added to the designated set, a combination of the sets, or to all of the sets.

As also indicated above, in yet another aspect of the invention a modifier, such as a multiplier, is associated with one or more of the selections. If a player picks a selection, which includes a modifier, the modifier changes the value of a set based on the modifier. A modifier may be associated with any designated set, a combination of the sets, or all of the sets.

Although the present invention is discussed relative to a bonus game of a gaming machine, it should be appreciated that the present invention could be employed as a primary game in a gaming device.

It is therefore an advantage of the present invention to provide a gaming device having a plurality of potential award sets and a player obtains an award associated with one of the award sets.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 13 is a schematic diagram illustrating an award distribution table;

FIG. 14 is a schematic diagram illustrating a component distribution table;

DETAILED DESCRIPTION OF THE INVENTION

Gaming Device and Electronics

Figure 1A:
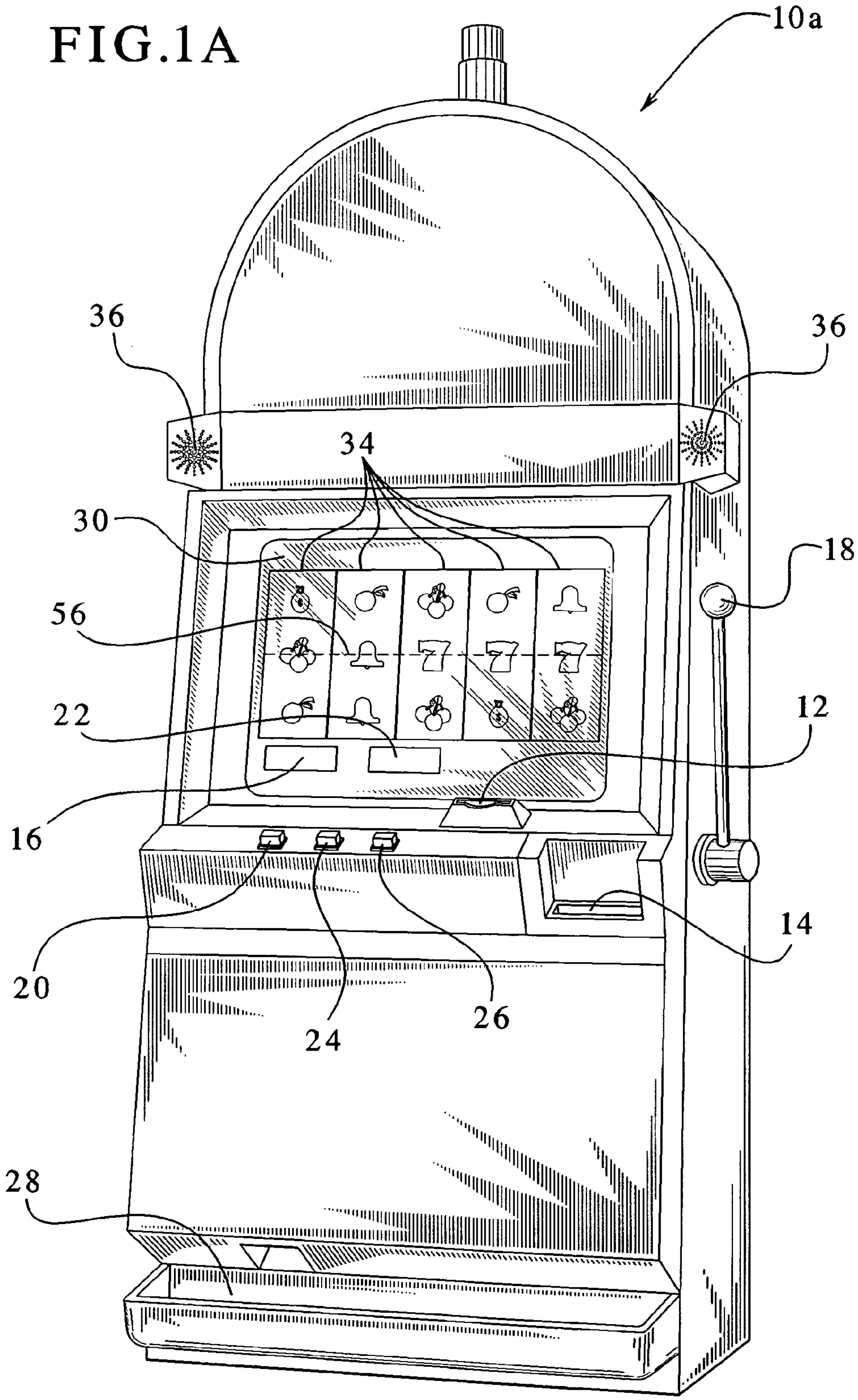
FIG. 1A is a front-side perspective view of one embodiment of the gaming device of the present invention.
Figure 1B:
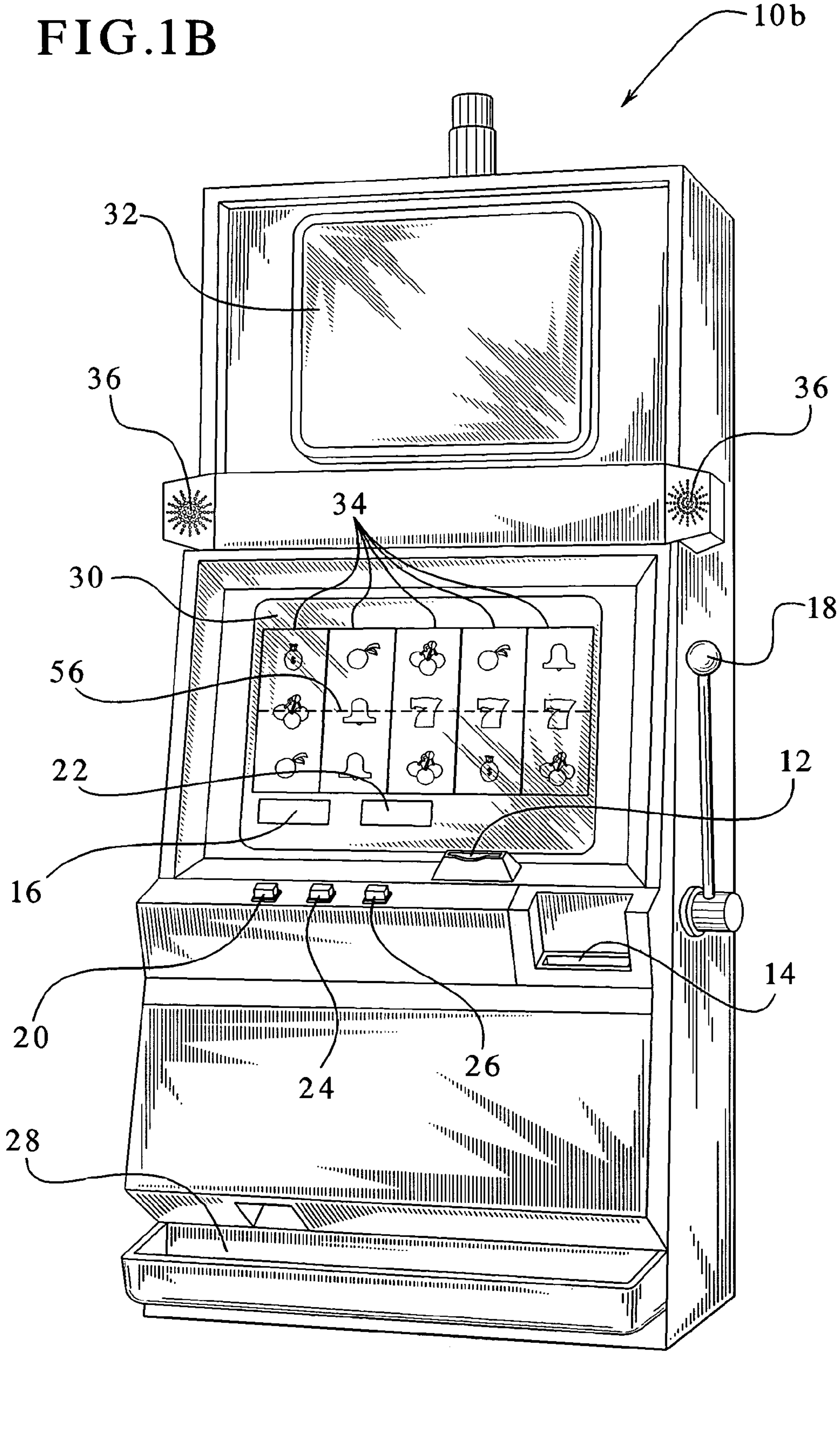
FIG. 1B is a front-side perspective view of another embodiment of the gaming device of the present invention.

Referring now to the drawings, and in particular to FIGS. 1A and 1B, gaming device 10*a* and gaming device 10*b* illustrate two possible cabinet styles and display arrangements and are collectively referred to herein as gaming device 10. The present invention includes the game of the present invention (described below) encompassing a stand alone game or a bonus or secondary game that coordinates with a base game. When the game of the present invention is a bonus game, gaming device 10 in one base game is a slot machine having the controls, displays and features of a conventional slot machine, wherein the player operates the gaming device while standing or sitting. Gaming device 10 also includes being a pub-style or table-top game (not shown), which a player operates while sitting.

The base games of the gaming device 10 include slot, poker, blackjack or keno, among others. The gaming device 10 also embodies any bonus triggering events, bonus games as well as any progressive game coordinating with these base games. The symbols and indicia used for any of the base, bonus and progressive games include mechanical, electrical or video symbols and indicia.

In a stand alone or a bonus embodiment, the gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. At any time during the game, a player may "cash out" by pushing a cash out button 26 to receive coins or tokens in the coin payout tray 28 or other forms of payment, such as an amount printed on a ticket or credited to a credit cards, debit cards or smart cards. Well known ticket printing and card reading machines (not illustrated) are commercially available.

Gaming device 10 also includes one or more display devices. The embodiment shown in FIG. 1A includes a central display device 30, and the alternative embodiment shown in FIG. 1B includes a central display device 30 as well as an upper display device 32. The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism. In a video poker, blackjack or other card gaming machine embodiment, the display device includes displaying one or more cards. In a keno embodiment, the display device includes displaying numbers.

The slot machine base game of gaming device 10 preferably displays a plurality of reels 34, preferably three to five reels 34, in mechanical or video form on one or more of the display devices. Each reel 34 displays a plurality of indicia such as bells, hearts, fruits, numbers, letters, bars or other images which preferably correspond to a theme associated with the gaming device 10. If the reels 34 are in video form, the display device displaying the video reels 34 is preferably a video monitor. Each base game, and preferably in the slot machine embodiment of the gaming device 10, includes speakers 36 for making sounds or playing music.

Figure 2:
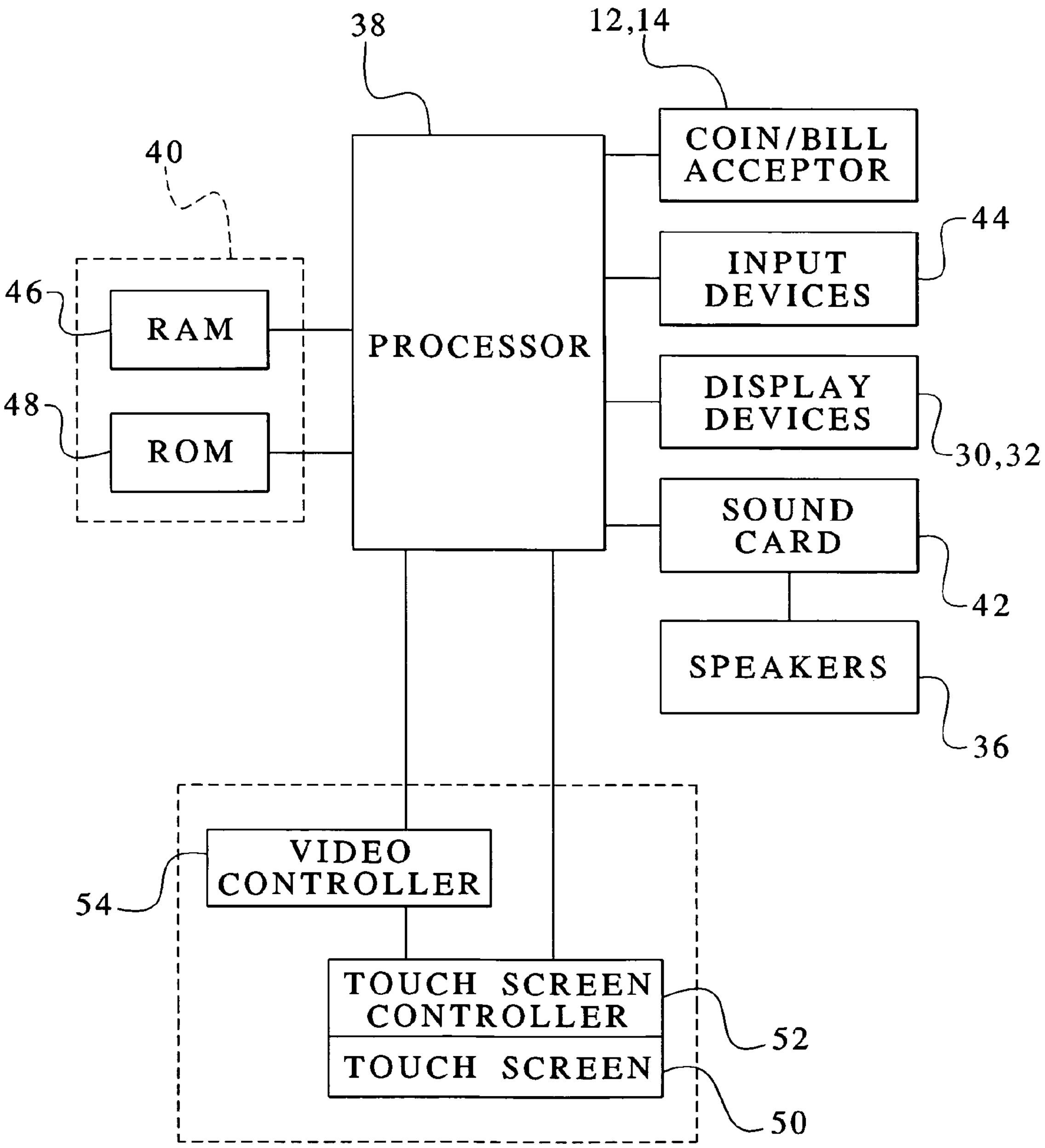
FIG. 2 is a schematic block diagram of the electronic configuration of one embodiment of the gaming device of the present invention.

Referring now to FIG. 2, a general electronic configuration of the gaming device 10 for the stand alone and bonus embodiments described above preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or the "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display device. A player can make decisions and input signals into the gaming device 10 by touching touch screen 50 at the appropriate places. As further illustrated in FIG. 2, the processor 38 connects to the coin slot 12 or payment acceptor 14, whereby the processor 38 requires a player to deposit a certain amount of money in to start the game.

It should be appreciated that although a processor 38 and memory device 40 are preferable implementations of the present invention, the present invention can also be implemented using one or more application-specific integrated circuits (ASIC's) or other hardwired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming the device 10, the player inserts the appropriate amount of money or tokens at coin slot 12 or bill acceptor 14 and then pulls the arm 18 or pushes the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning base game credits, the gaming device 10, including any of the base games disclosed above, also includes bonus games that give players the opportunity to win credits. Bonus games include a program that automatically begins when the player achieves a qualifying condition in the base game. The gaming device 10 preferably employs a video-based central display device 30 or 32 for the bonus round.

In the slot machine embodiment, the qualifying condition includes a particular symbol or symbol combination generated on a display device. As illustrated in the five reel slot game shown in FIGS. 1A and 1B, the qualifying condition includes the number seven appearing on three adjacent reels 34 along a payline 56. It should be appreciated that the present invention includes one or more paylines, such as payline 56, wherein the paylines can be horizontal, diagonal or any combination thereof.

Multiple Potential Award Sets

Figure 3:
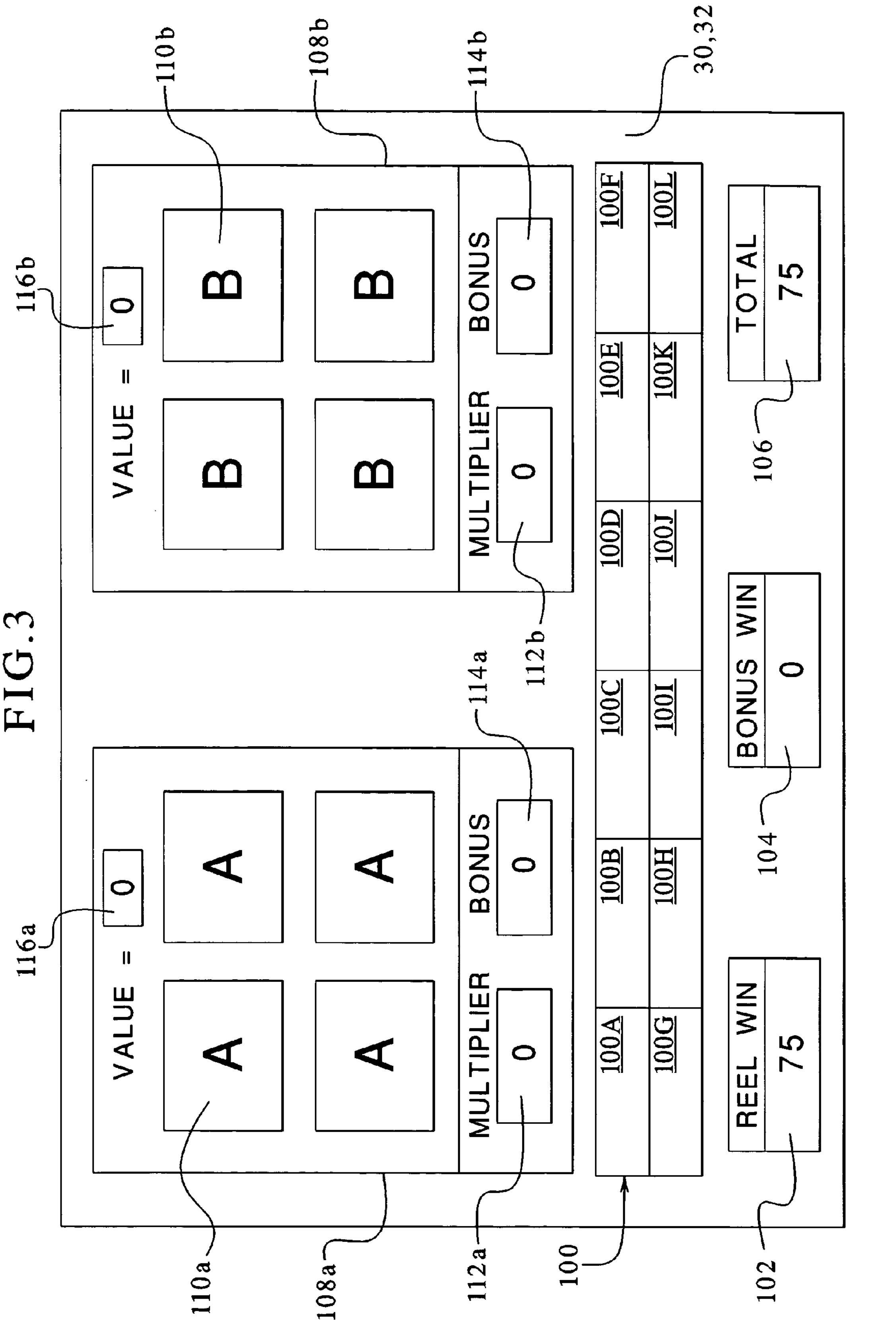
FIG. 3 is an enlarged front elevational view of one of the display devices of FIGS. 1A and 1B, which illustrates one general embodiment of the present invention.
Figure 4:
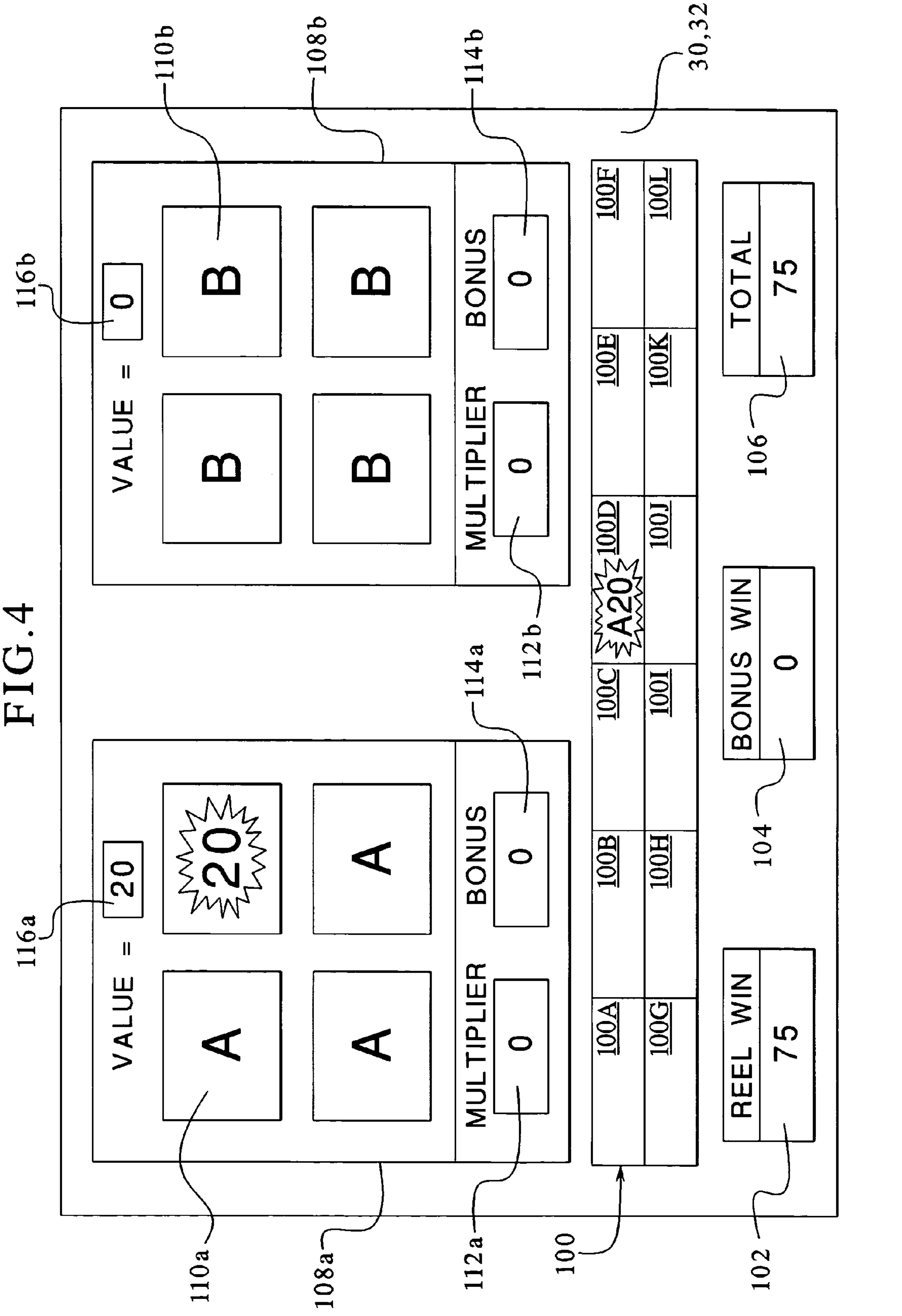
FIG. 4 is an enlarged front elevational view of one of the display devices of FIGS. 1A and 1B illustrating a first selection by a player.

Referring now to FIG. 3, one general embodiment of the present invention includes a display on a display device 30 or 32 having a plurality of masked selections 100 (including selections 100*a*, 100*b*, 100*c*, 100*d*, 100*e*, 100*f*, 100*g*, 100*h*, 100*i*, 100*j*, 100*k* and 100*l*) and at least two sets 108*a* and 108*b*. The selections 100 are preferably simulated selections on the display device 30 or 32, and the display device preferably includes a touch screen 50 and associated touch screen controller 52 (see FIG. 2). Each selection is a separate area of the display device adapted such that when a player touches an area, the touch screen 50 and controller 52 send a discrete input to the processor 38.

The selections may alternatively be electromechanical input devices 44 mounted to the cabinet of the gaming device 10 (see FIG. 2). The electromechanical selections are adapted such that when a player touches or presses a selection, the input device 44 typically closes a circuit (not illustrated), which sends a discrete input to the processor 38. One preferred embodiment of the present invention includes twelve selections, 100*a* through 100*l* as indicated above; however, the, present invention may include any suitable number of selections. All of the selections are preferably masked, although it should be appreciated that certain selections may not be masked. Any symbol or indicia could be used in connection with a masked selection as desired by the implementor.

The paid display 102 is preferably simulated on the display device 30 or 32, as illustrated, but may alternatively be an electromechanical device mounted to the cabinet of the gaming device 10. The paid display 102 indicates the value of a recent award paid to the player and is distinguishable from the credit display 16, which shows the recent award plus the player's previous total award.

The bonus game display 104 shows the award received by a player for completing a set or finishing the game. In addition, the total display 106 shows the total credits that the player received in the bonus game, which is the sum of the paid display 102 and the bonus game display 104.

In the preferred embodiment, each set 108*a* and 108*b* preferably includes a plurality of components, and specifically a plurality of value components 110*a* and 110*b*, respectively, having symbols or component identifiers associated with each set, at least one modifier component 112*a* and 112*b*, respectively, and at least one bonus component 114*a* and 114*b*, respectively. Each set includes at least one component and preferably includes a plurality of components as desired by the implementor. The components may be black or related to indicia such as symbols, which may be letters, numbers, shapes or any other characteristic desired by the implementor. The player generates the value components displayed in the sets by picking the selections. When a player generates all the value components located within a set, the bonus game ends. Thus, a player's objective is to complete the set having the highest award and receive the award associated with that set. Preferably an award consists of credits, but the award may include other types of awards such as merchandise as desired by the implementor of the game.

As shown in FIG. 3, the sets 108*a* and 108*b* each include at least one value component. Sets 108*a* and 108*b* each include four value components 110*a* and 110*b*, respectively, but it should be appreciated that a set may include one value component or several value components. The sets 108*a* and 108*b* may also include other components. In FIG. 3, the sets 108*a* and 108*b* include modifier components 112*a* and 112*b*, respectively, and bonus components 114*a* and 114*b*, respectively. These components are preferably simulated indicators on the display device 30 or 32, as illustrated, and are alternatively electromechanical devices mounted to the cabinet of the gaming device 10. Each set 108*a* and 108*b* also includes total value displays 116*a* and 116*b*, respectively, for displaying the total value of each set.

The modifier component includes any modifiers such as multipliers that the player receives for that set. The modifiers may be any mathematical operation, calculation, value or factor desired by an implementor. Preferably, the modifier will be a multiplier. Modifiers may be associated with one set or more sets. It is contemplated that a player may receive a modifier in each set, one set or no sets. A modifier modifies a player's total value for a set. Therefore, the modifier changes the award for the set and enhances the player's excitement and enjoyment of the game.

The bonus component includes bonuses such as bonuses that a player receives during a game. The bonuses may be associated with one set or several sets within a game. In a game, a player may receive bonuses in each set or in all of the sets. Once a set is complete, the bonuses are added to the value components to attain a total award for a set.

The set value displays 116*a* and 116*b* displays the total value of the sets 108*a* and 108*b*, respectively, where the total value is determined as the sum of the value components and any bonuses, modified by any modifiers. The total value is preferably the award associated with the set. Thus, when a set is completed by a player and the game ends, the award shown in the set value display in the set provided to the player is transferred to the bonus win game display 104.

FIG. 3 illustrates one embodiment of a display device 30 or 32, as it may appear to a player when the game begins. The value components 110*a* and 110*b* in the sets 108*a* and 108*b* may be individually generated (i.e., a selection relates to a specific component) or generically generated (i.e., a selection relates to any value component in the set). The selections 100 are preferably masked when the game begins. The selections 100 provide the components as a player picks the selections. The selections are unmasked as the selections are picked. After being picked, the selections preferably remain unmasked until a set or required components of a set are completed and the game ends. Alternatively, a selection may be re-masked and returned to the group of selections the player can choose from.

The modifier components 112*a* and 112*b*, bonus components 114*a* and 114*b* and the set values 116*a* and 116*b* all begin the game at a predetermined value. In addition, the bonus win game display 104 and the total award display 106 start at a predetermined value. The paid display 102 starts with a value associated with a previous game, games such as the bonus triggering game.

FIGS. 4 through 9 illustrate an example play of the game from beginning to end, which occurs when a set is completed by a player. In FIGS. 4 through 9, only six picks are needed to complete the game. It should be appreciated that more or less picks may be needed to complete a game. The number of picks needed to complete a game depends on the number of sets, the number of and the number of components in each set (including the components need to complete a set).

The player starts the game by picking one of the masked selections 100. In this example, the player picks the selection 100D which is a value component. Each value component preferably has with a set indicator and a value. It should be appreciated that a value component may be associated with a set indicator, a value or any combination of indicators and values. In this example, the value component 110D has or is associated with an indicator "A" for the first set 108*a* and a value of "20." The value component is transferred to the first set 108*a* based on the set indicator. Once the value component is transferred to the first set 108*a*, the set value display 116*a* shows the present value of the first set, which is the cumulative value of the value components 110*a*, any bonuses in the bonus component 114*a*, modified by any modifiers in the modifier component 112*a*. In this example, the value of the bonus component 114*a* and the modifier component 112*a* are zero, therefore the set value display 11 6*a* shows the present value of the first set 108*a* after the first pick by the player, which is twenty.

Figure 5:
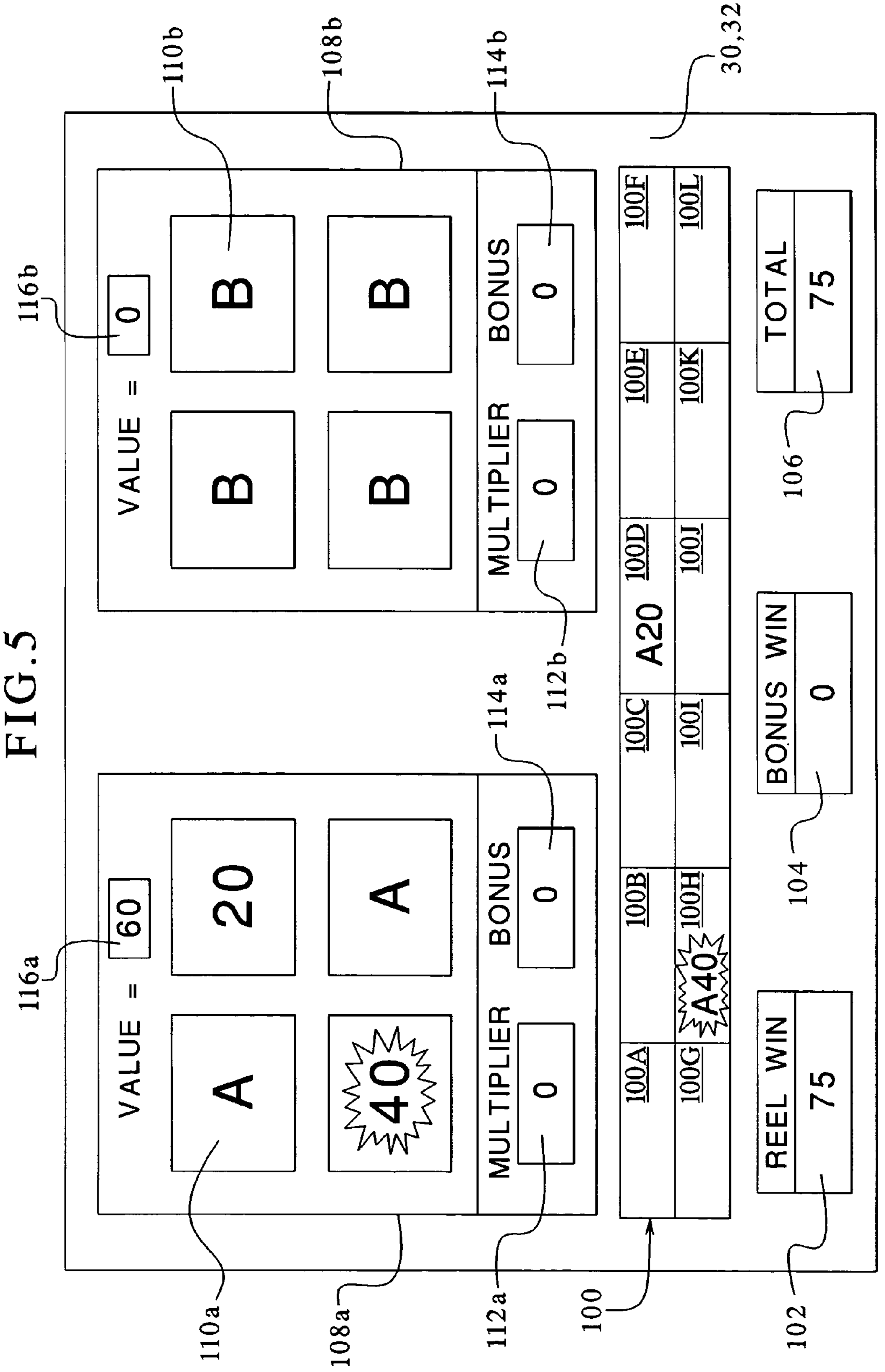
FIG. 5 is an enlarged front elevational view of one of the display devices of FIGS. 1A and 1B illustrating a second selection by a player.

FIG. 5 illustrates the second pick by the player in the game. The player picks selection 100H which is a value component which is associated with the first set 108*a* and has a value of "40." The second value component is transferred to the first set 108*a* and the total value or award for the set is shown in the set value display 116*a* which is sixty (i.e., the cumulative value of the value components, bonuses and modifiers associated with the first set 108*a*).

Figure 6:
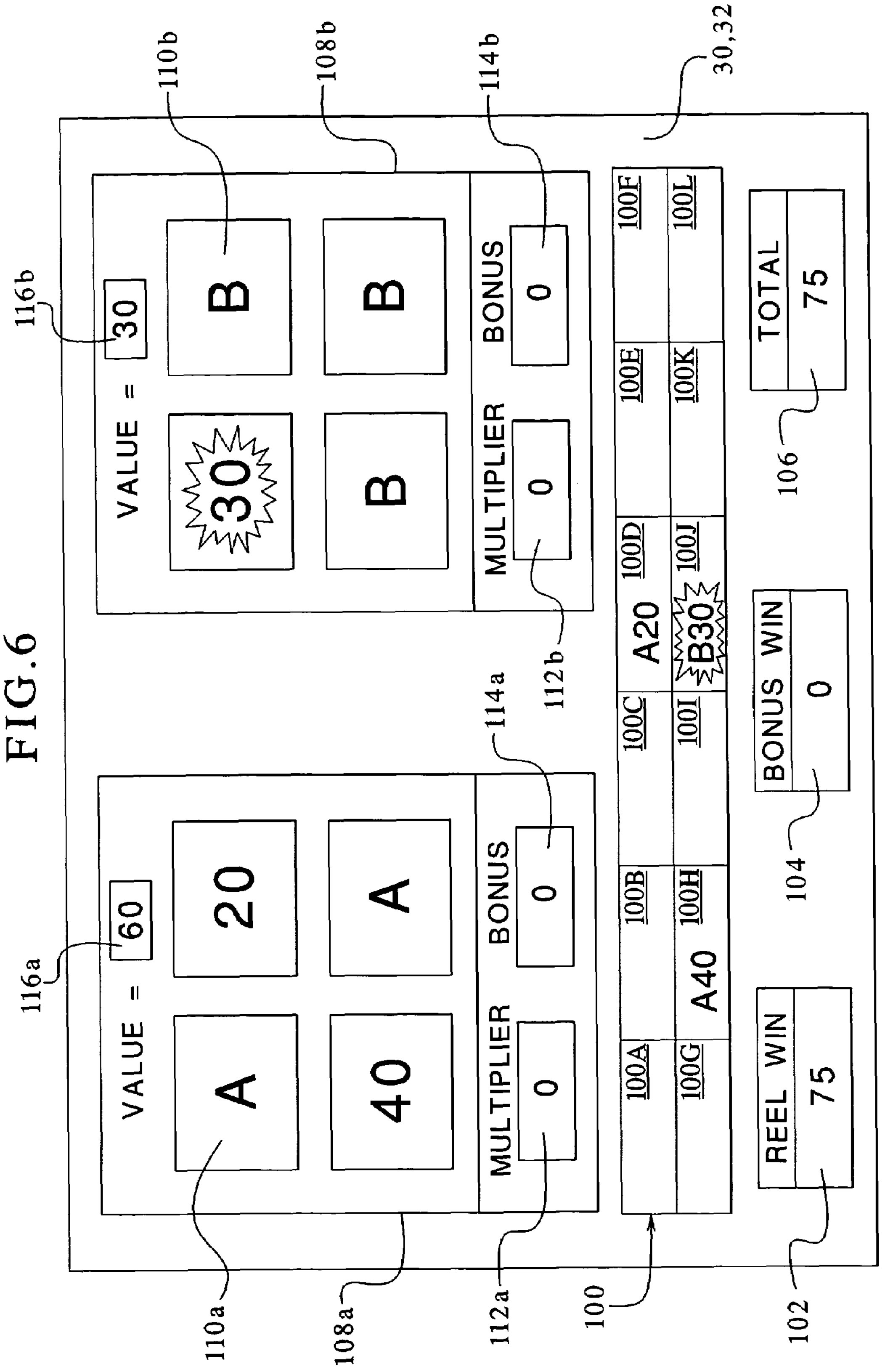
FIG. 6 is an enlarged front elevational view of one of the display devices of FIGS. 1A and 1B illustrating a third selection by a player.

FIG. 6 illustrates the player third selection 100J. The third selection 100J display a value component which has an indicator "B" that associates this component with the second set 108*b*. The value component has a value of "30" which is transferred to set 108*b*. The set value display 116*b* for the second set 108*b* shows the present value for the set. At this point, the second set 108*b* has a total value or award of thirty, which is the sum of any value components 110*b* and bonus components 114*b*, modified by the modifier component 112*b* for that set.

It should be appreciated that a player may complete either the first set 108*a* or the second set 108*b*. In the embodiment, a set is completed when all of the value components in the set have values. Preferably, the sets are not completed at the same time. If they are, both sets could be provided to the player or an alternative award may be provided to the player. The player's goal is to complete the set that will give the player the highest value for the game.

Figure 7:
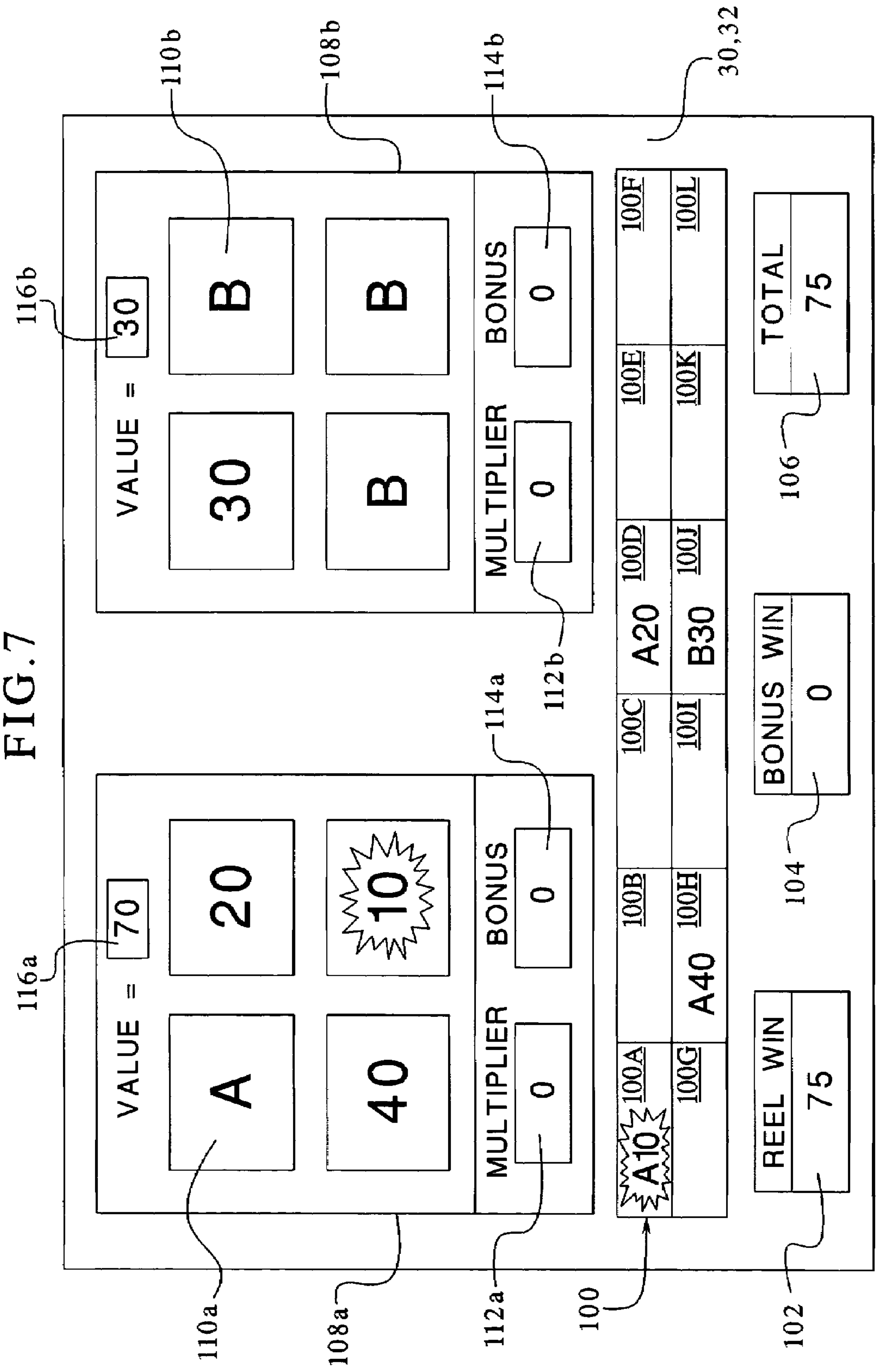
FIG. 7 is an enlarged front elevational view of one of the display devices of FIGS. 1A and 1B illustrating a fourth selection by a player.

FIG. 7 illustrates the player's fourth selection 100A, which provides a value component that includes an identifier associated with the first set 108*a*. The value of the value component is transferred to the first set 108*a*, as illustrated. The value of the first set 110*a* becomes seventy, as displayed in the set value display 116*a*.

Figure 8:
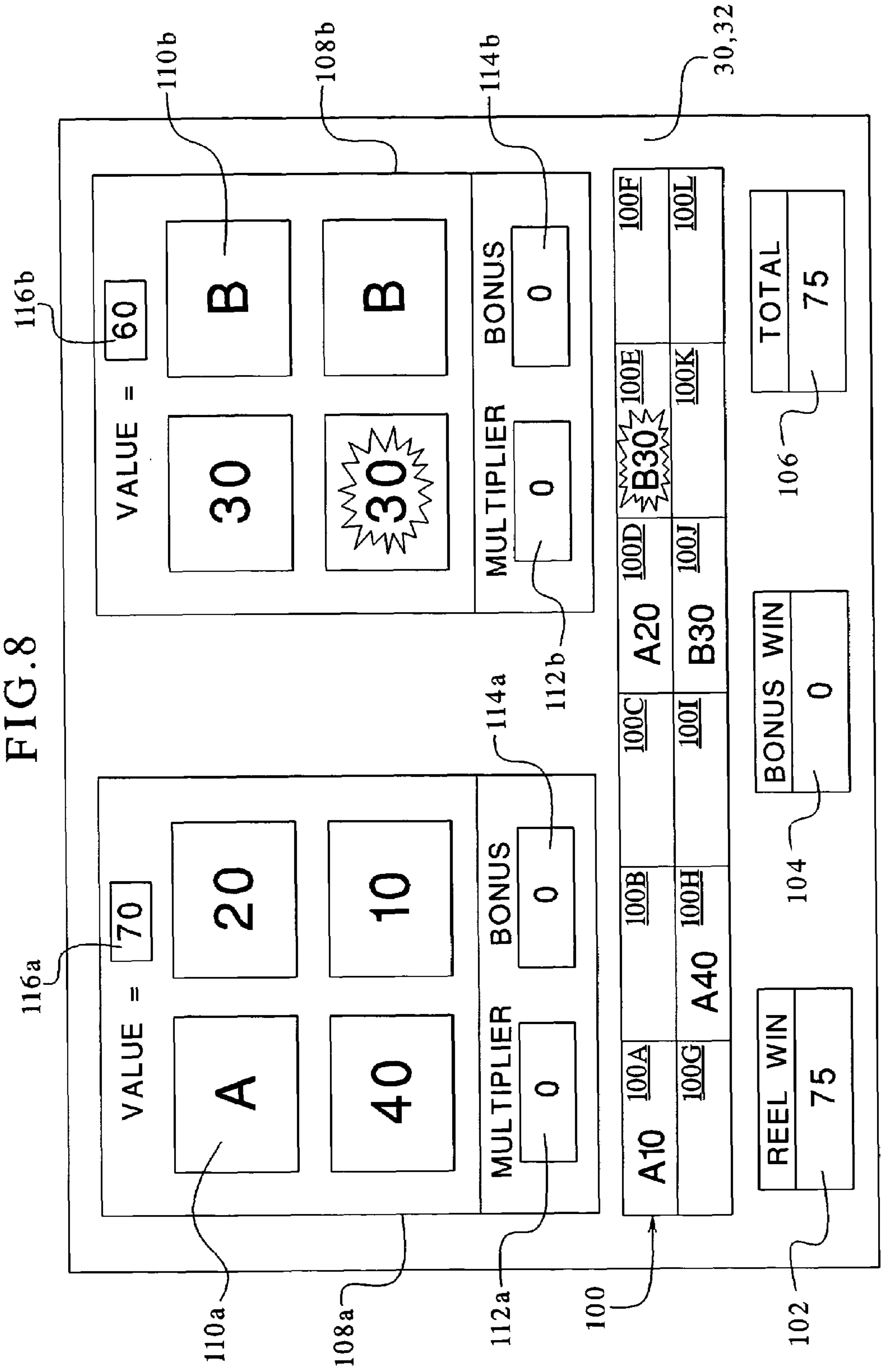
FIG. 8 is an enlarged front elevational view of one of the display devices of FIGS. 1A and 1B illustrating a fifth selection by a player.

FIG. 8 illustrates the player's fifth selection 100E which provides a value component which is associated with the second set 108*b*. The value "30" of the value component is transferred to the second set 108*b* and added to the total value of that set or shown in the set value display 116*b*.

Figure 9:
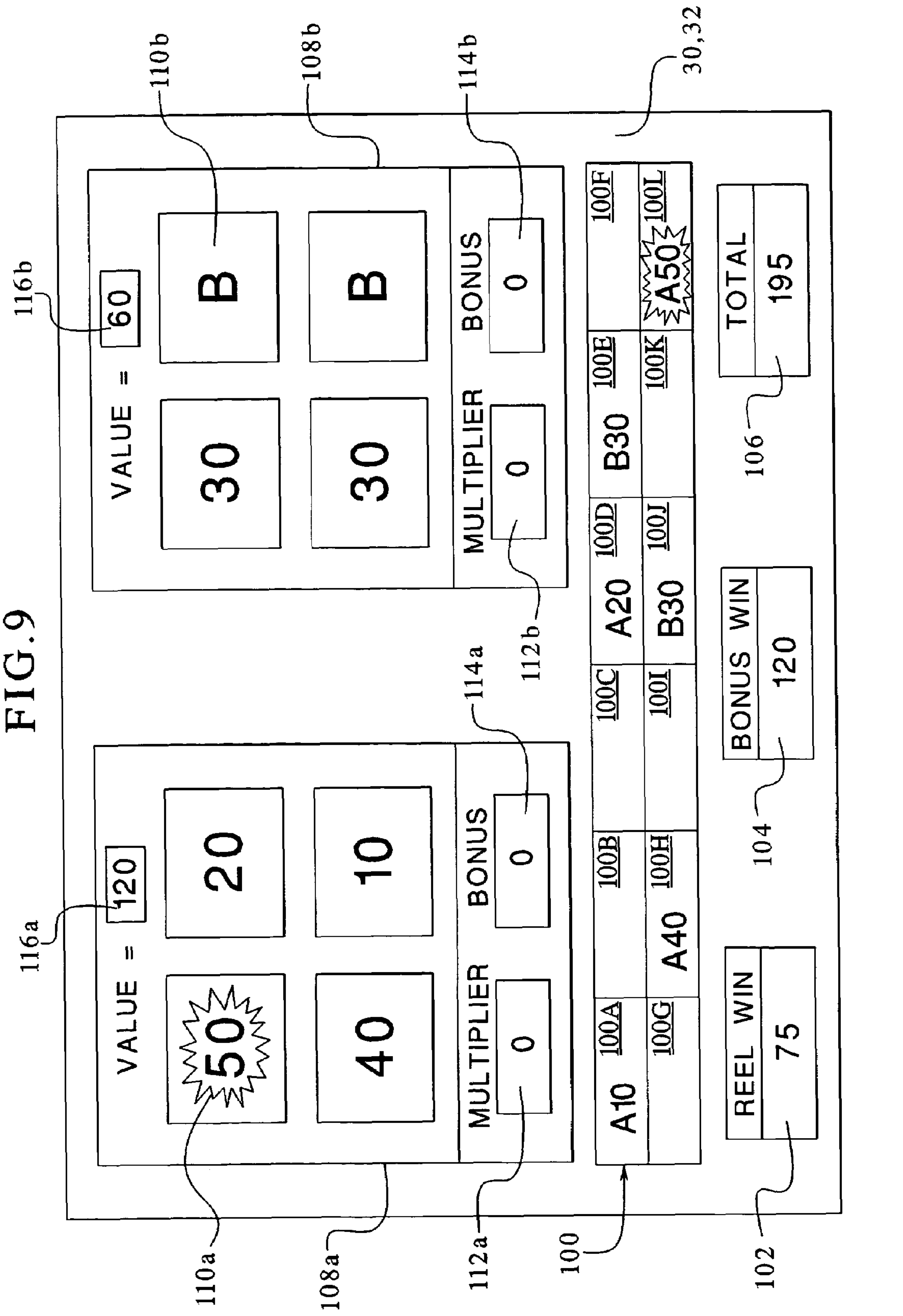
FIG. 9 is an enlarged front elevational view of one of the display devices of FIGS. 1A and 1B illustrating a final selection by a player that completes a set.

FIG. 9 illustrates the player's sixth selection 100L, which provides a value component associated with the first set 108*a*. The value "50" is transferred to the first set 108*a*, as illustrated. The value of the first set 108*a* is one hundred twenty, as displayed in the set value display 116*b* for the first set 108*a*. The present value of the first set 108*a* is the sum of all four value components and any bonus components for that set, modified by any modifier components for that set. In this example, there are no bonus or modifier components, therefore the total award for set 108*a* is the sum of the value components 100*a*. It should thus be appreciated that the present invention can be employed with value components and without modifier, bonus or other components.

The sixth pick by the player was the final pick of the game because this pick completed the first set 108*a* which was the requirement of this embodiment. Once a set is complete in the preferred embodiment, the game ends and the player receives the total value or award associated with that set. In this example, the player receives the value indicated in the set value display 116*a* for set 108*a*, which is one hundred twenty. This value is now transferred to the bonus game display 104. Since the game has ended, the value in the paid display 102 is added to the value in the bonus game display 104 to give the player their total award shown in the total award display 106. In this example, the player receives seventy-five plus one hundred twenty to give them a total award of one hundred ninety-five.

It should be appreciated that the player could have completed the second set 108*b* before the first set 108*a*. Therefore, the outcome of the game is dependant on the selections 100 that the player picks during the game. In some games, the player may desire to complete one set before another because that set has a higher total award than the other set or sets. The uncertainty related to the completion of the sets enhances the player's excitement and enjoyment of the game.

In another embodiment of the game, a player picks a selection 100 and receives a bonus component associated with a particular set. The bonus component can be added to one or more sets or to all of the sets in a game. A game may have no bonus components or as many bonus components as desired by the implementor of the game, provided that the sets can be completed. It should also be appreciated that a bonus component can be used as a partial or complete set completion component (i.e., picking a bonus component is required to complete a set, is part of completing a set, equals two or more value components toward completion, or automatically completes a set).

Figure 10:
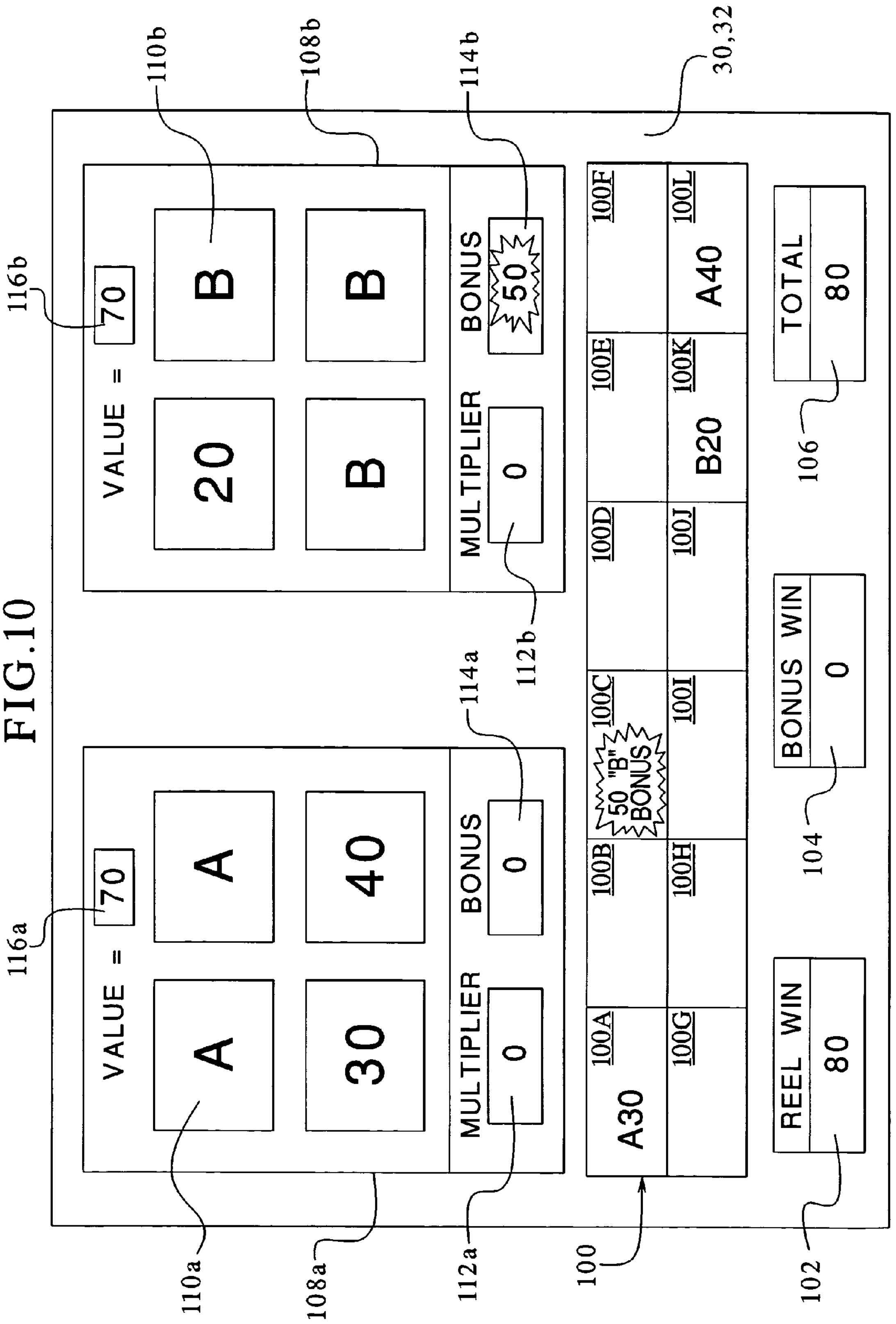
FIG. 10 is an enlarged front elevational view of one of the display devices of FIGS. 1A and 1B illustrating a further bonus component selected by a player.

FIG. 10 illustrates an example game where a player picks a selection 100C that provides a bonus component which includes a set identifier, a bonus identifier "Bonus" and a value "50" associated with it. The set identifier "B" Bonus associates the bonus component with a set. It should be appreciated that a bonus component may be associated with one set, several sets or all of the sets in a game. In FIG. 10, the bonus component is only associated with set 108*b*, and therefore the value of the bonus component is transferred to that set. The bonus component's associated value is fifty and this value is added to the total award for the set in the example illustrated in FIG. 10.

The bonus components add to the total award of a set and increase the awards that a player can win in a game. In some circumstances, the bonus components may make one set more valuable than another set. Since the player's goal is to complete the set with the highest value, the bonus components create larger awards and thereby enhance a player's excitement and enjoyment of the game.

Figure 11:
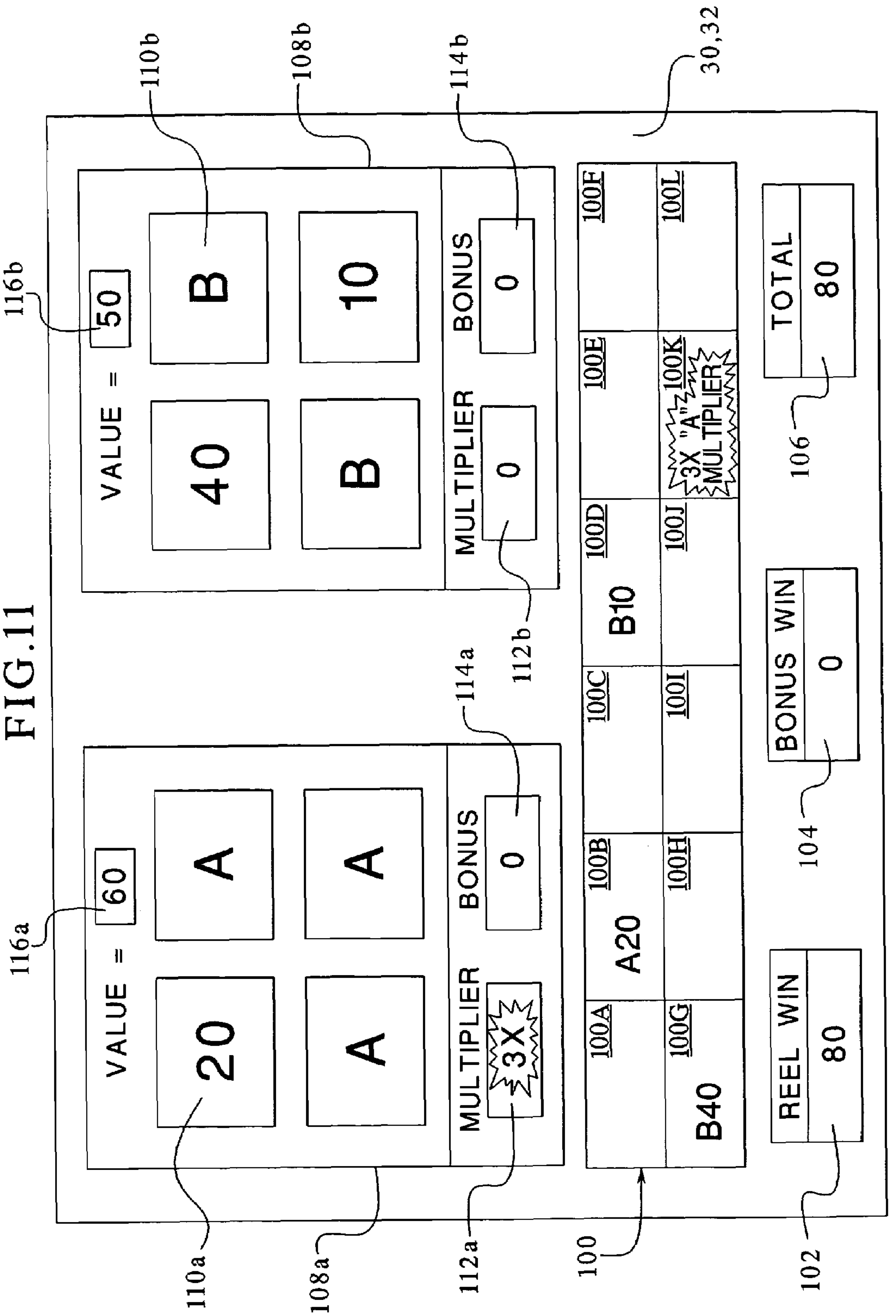
FIG. 11 are enlarged front elevational views of one of the display devices of FIGS. 1A and 1B illustrating a modifier component selected by a player.

FIG. 11 illustrates another example game where a player picks selection 100K. The selection provides a modifier component which has a set identifier "A" that associates the modifier component with set 108*a*, a modifier identifies "Multiplier" that identifies the type of the selection, and modifier "3×." It should be appreciated that a modifier component may be associated with one set, several sets or all of the sets in a game. In FIG. 11, the modifier component is only associated with set 108*a*, therefore the modifier component is transferred to that set. The modifier component is in this example a multiplier, but may be any other type of modifier that changes the award in a set as discussed above.

The award for set 108*a*, including any bonus components, is modified by the modifier to achieve the award for that set as shown in the set value display 116*a*. In this example, the modifier is a multiplier "3×", which means that the sum of the value components and the bonus components in set 108*a* will be multiplied by three to achieve the award for that set.

The modifier component 112*a* increases the total award for the set and increases the award that a player can win in the game. In some circumstances, the modifier may make one set more valuable than another set. The player's goal is to complete the set with the highest value. Therefore, the modifier component increases the awards received by a player and thereby enhances a player's excitement and enjoyment of the game.

Figure 12:
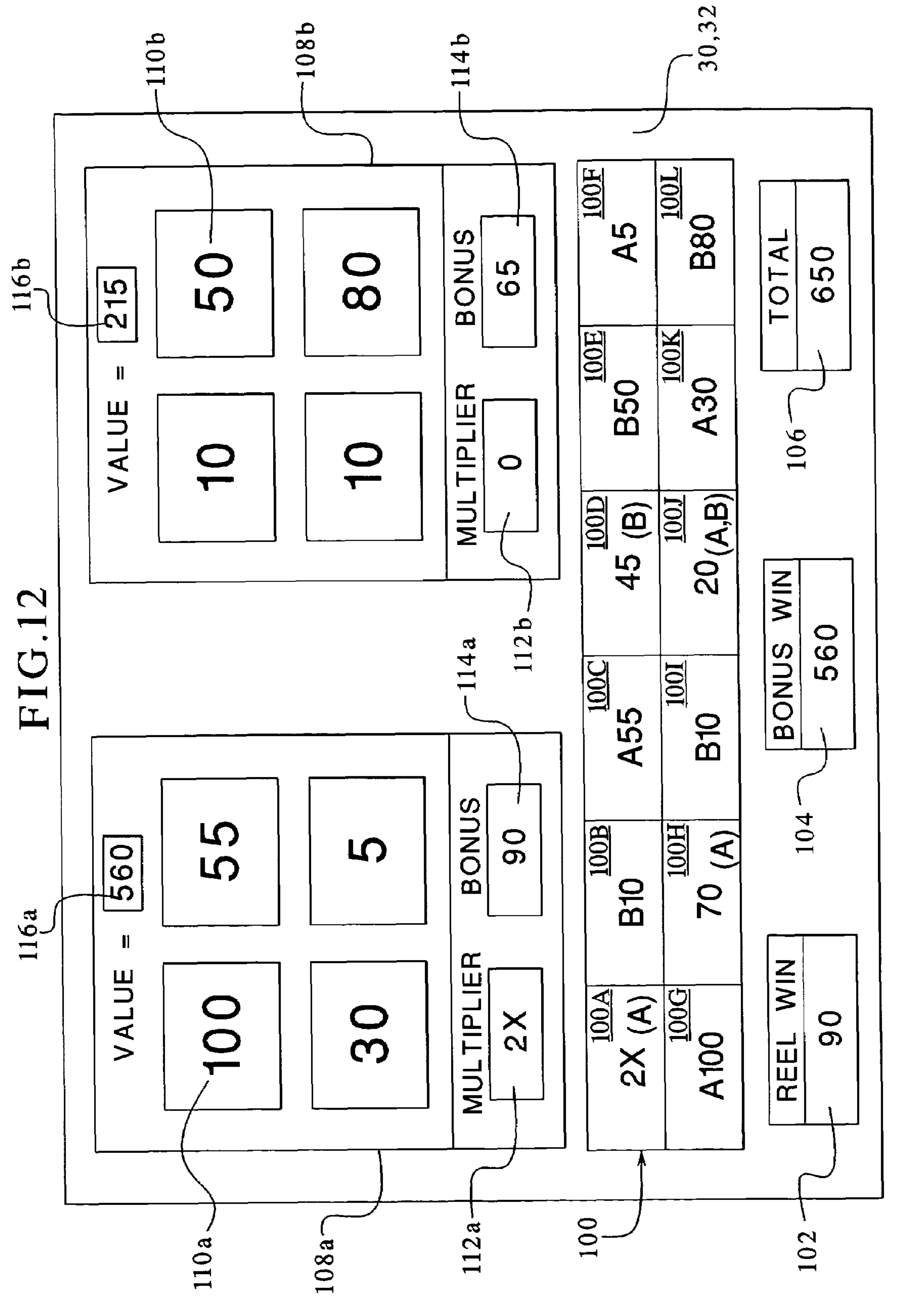
FIG. 12 is an enlarged front elevational view of one of the display devices of FIGS. 1A and 1B illustrating unmasked components and selections.

FIG. 12 illustrates all of the selections revealed. In this example, the present invention includes twelve selections 100 that provide various components and values. The selections provide value components (such as 100*b*, 100*c*, 100*e*, 100*f*, 100*g*, 100*i*, 100*k* and 100*l*) and preferably four value components for each set. The selections also include three bonus components (such as selections 100*d*, 100*h* and 100*j*) and one modifier component (such as selection 100*a*). It should be appreciated that the selections may have more or less than twelve selections and that the number of value components, bonus components and modifier components vary as desired by an implementor.

Referring now to FIG. 13, an award table 118 illustrates at least a portion of an award database that the present invention may employ to generate an award. The award table 118 includes a plurality of awards 120 having any desired predetermined distribution of values. The awards 120 may include bonuses, modifiers or other items of value such as a number of picks from an award pool (not shown). The present invention includes the game being enabled or not being enabled to randomly select an award 120 a plurality of times.

The present invention also includes adapting the game to randomly generate awards 120 from the award table 118 using one of two methods. In a first award generation embodiment, the game randomly assigns an award to each of the selections 100 (FIG. 3) at the beginning of the game. For example, the game randomly assigns the 10 award to a first selection, the 20 award to a second selection, etc., before the player begins picking selections 100. The game then generates an award depending upon which selection 100 the player picks.

In a second award generation embodiment, the game randomly assigns an award 120 to a pick of an order. That is, the player makes a first pick, a second pick, a third pick, etc. The game randomly assigns, e.g., the 10 award to the first pick, the 20 award to the second pick and so on. The present invention includes the game randomly assigning awards to a plurality or all of the picks before the player begins picking selections 100 or alternatively assigning each award directly to a selection 100 after the player picks a selection.

In FIG. 13, the award table 118 illustrates at least a portion of an award database that the present invention employs to generate an award. The awards 120 each include an associated likelihood percentage 122 that the processor 38 (see FIG. 2) utilizes to select a particular award. The game contemplates probabilities or likelihood percentages 122 having any desired distribution, wherein the percentages preferably add to 100%. For example in award table 118, the game is twice as likely to select one of the 15, 20, or 25 awards as it is to select either the 10, 30 or 35 awards.

Similarly, the award table 118 may be employed for each component in a game, including the bonus and modifier components. It should be appreciated that the award tables may employ the same awards or different awards, as well as have the same award likelihood percentages or different award likelihood percentages. Therefore, each award table 118 may have different award values 120 and different award distribution percentages 122.

FIG. 14 illustrates another example of how the game may randomly distribute components within the game based on likelihood percentages. The component distribution table 124 is employed by the processor 38 to distribute components to a particular set or sets based on probabilities or likelihood percentages 126. The component distribution table 124 includes as many set locations 128 as there are sets 108 in a game. The set locations 128 each include an associated likelihood percentage 126 that the processor 38 (see FIG. 2) utilizes to select the particular set location. The game contemplates probabilities or likelihood percentages 126 having any desired distribution, wherein the percentages preferably add to 100%. In this example, a component such as a modifier component is twice as likely to be assigned to set A or set B as it is to both sets A and B. It should be appreciated that a game may employ the same likelihood percentages 126 or each component may have its own component distribution table 124 with likelihood percentages 126.

Preferred Multiple Potential Award Game Embodiment

Referring again to FIG. 12, one preferred embodiment of a multiple potential award game is illustrated fully revealed or unmasked on a display device 30 or 32 to show each of its game outcomes. The preferred multiple potential award game includes at least two sets having one or more value components per set, at least one modifier component, at least one bonus component and a plurality of selections 100.

The preferred multiple potential award game requires the player to pick selections until a set is complete. Any player pick of the selections may generate a value component, multiplier component or a bonus component. Each player pick preferably adds value to the award for a set or both sets. It should be appreciated that alternatively, a selection may not affect a set, may reduce the value of a set, or may change one of the components of a set. Once a player completes a set, the player receives the award associated with that set. Alternatively, the player may receive the value of the last set completed, the value of an intermediate set completed, or some award associated with a completed or uncompleted set. The award is added to any awards that a player received from a previous game or games and a new award total is calculated for the player.

Figure 15:
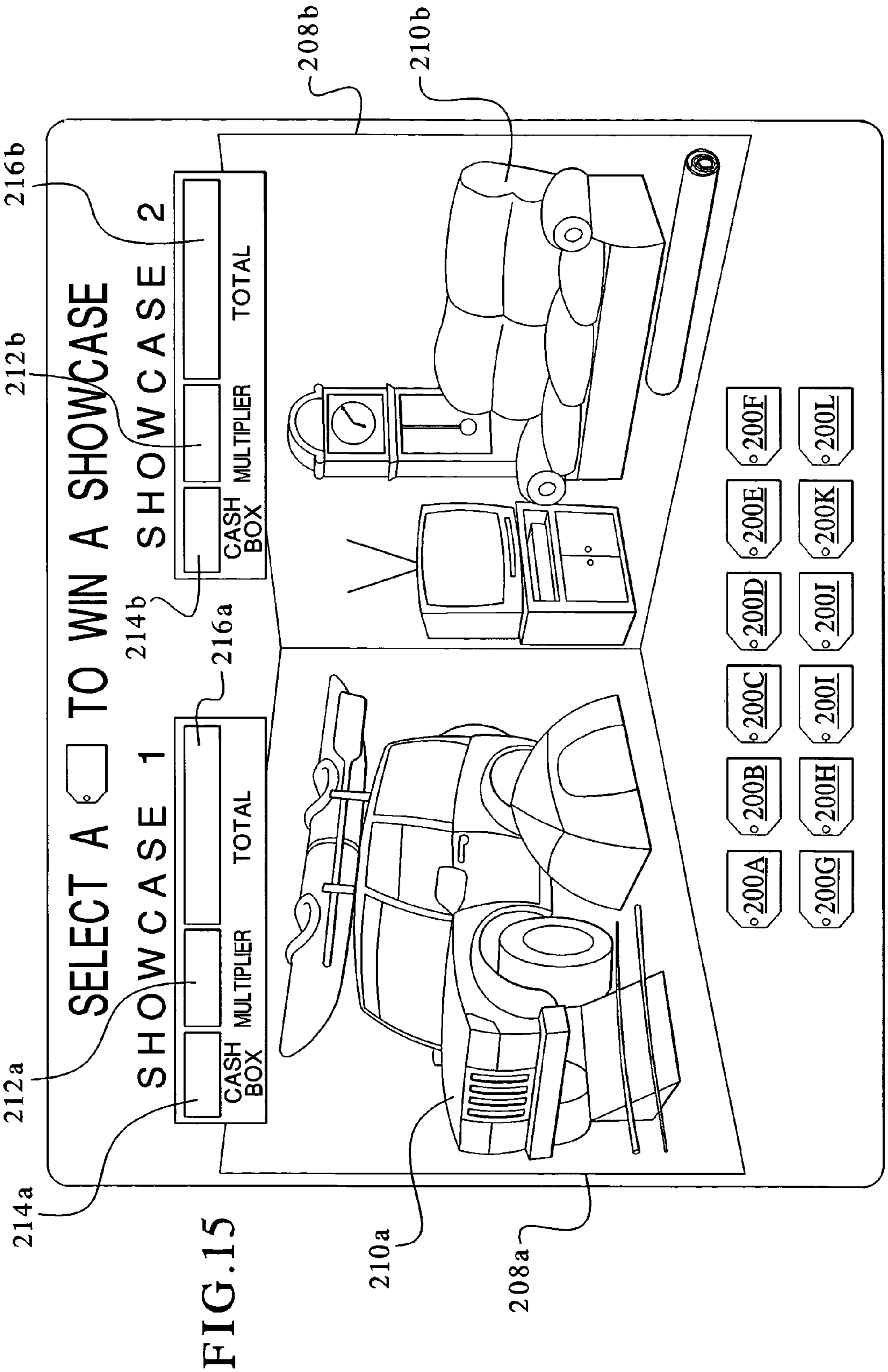
FIG. 15 is an enlarged front elevational view of one of the display devices of FIGS. 1A and 1B illustrating an embodiment of the invention where the value components are different objects which represent values.

FIG. 15 shows a further embodiment of the present invention where the potential award sets 208*a* and 208*b* include value components such as 210*a* or 210*b*, that are objects or items which represent a value. Alternatively, the object could be prizes awarded to the player which is the item itself. In this embodiment, a player picks one of the selections, 200A to 200L. The player's selection reveals an item associated with one set or more than one set. Each item is associated with a value, which is transferred to the associated value component, 210*a* or 210*b*, for each set. The player completes a set or sets by picking all the value components 210*a* or 210*b* for the set. Once a set is completed, the player receives the total value for that set associated with the items in the set.

The total value of a set is based on the bonuses, modifiers and value components picked by the player for that set. The bonus values, if selected, are displayed in the bonus value components 214*a* and 214*b* for each set. Similarly, modifier values such as multipliers, are shown in the modifier components 212*a* and 212*b* for each set. The total value of a set is determined by adding the value components and any bonus values selected by a player. This sum is then modified by any modifier values selected by the player and the resultant total is displayed in the set value components 216*a* and 216*b* for each set.

In FIG. 15, the first set 208*a* includes items associated with an outdoor theme illustrated by the truck, tent, canoe and fishing poles. The second set 208*b* includes items associated with a household theme illustrated by the couch, television, rug and clock. A player picks a selection 200A to 200L. Subsequently, the picked selection reveals a value component from either set 208*a* or 208*b*. It is contemplated that a selection may reveal a value component associated with more than one set. If the player's selection reveals the truck, a value associated with the truck is transferred to the value component 210*a*. If the selection reveals the couch, a value associated with the couch is transferred to the set value component 210*b*. The picked selections may also reveal bonuses and modifiers that add to the potential award for a set.

A player completes a set by selecting each value component within a particular set. For example, if a player picked selections 200 such that they revealed the truck, tent, canoe and fishing poles, the player completes set 208*a*. The total value of the components is added to the bonus values picked by a player and then modified by the modifier value, if any, shown in the modifier components 212*a* 212*b* to achieve the total value of the set as displayed in the set value component 216*a* and 216*b*. The set value component is the total award that the player receives for completing that set.

Figure 16:
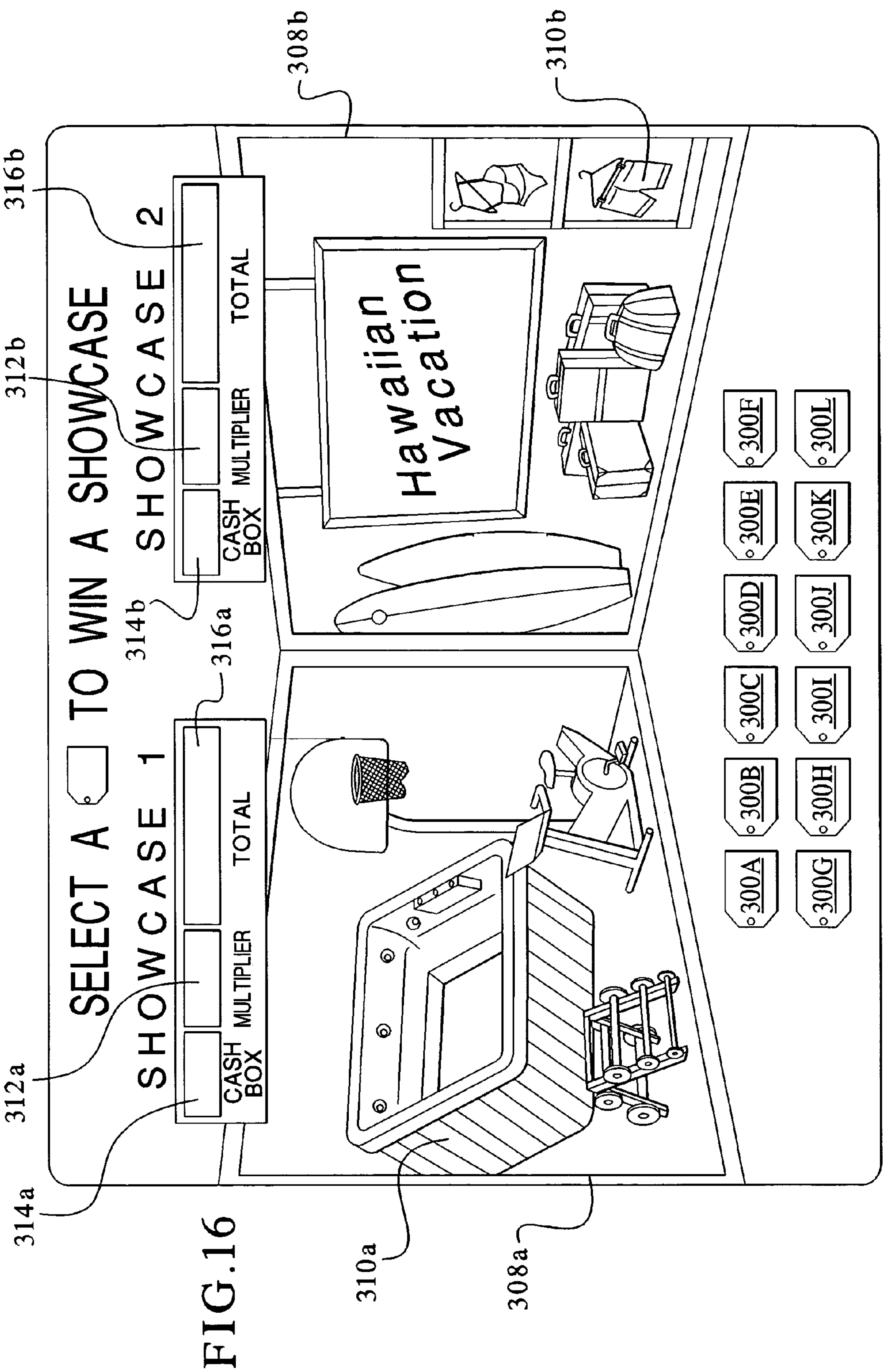
FIG. 16 is an enlarged front elevational view of one of the display devices of FIGS. 1A and 1B illustrating another embodiment of the invention where the value components are different objects which represent values.

FIG. 16 illustrates another embodiment where the value components of set 310*a* are recreational items such as a hot tub, basketball hoop, exercise bike and dumbbells. In set 310*b*, the value components are associated with a trip or vacation and include a Hawaiian vacation, surfboards, luggage and bathing suits.

A player picks the selections 300 until the player completes one of the sets 310*a* or 310*b*. For example, a player may pick selections 300 and reveal the hot tub, basketball hoop, exercise bike and dumbbells. If the player picks these value components before picking all of the value components in set 308*b*, then the player receives the total value of the recreational set 308*a*.

The value of the recreational set 308*a* is the total value of the components of that set. Each component, the hot tub, basketball hoop, exercise bike and dumbbells, are associated with a value. When that component is selected, the component value is transferred to the set value component 310*a* and/or 310*b*. Once the set is completed, the set value component 310*a* or 310*b* is modified by the modifier value, if any, in 312*a* and 312*b*. The total value is then displayed in the set value component 316*a* and 316*b*. The total value shown in the set value component is the award that the player receives for completing that set.

Similarly, if the player completed set 308*b* first by selecting the couch, television, rug and clock, the player receives the award shown in the total value component 316*b*. The total value component is the sum of the value components 310*b* plus any bonus values shown in 312*b*, and then modified by any modifiers selected in the game.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device controlled by a processor, said gaming device comprising:

a primary game controlled by the processor and operable upon a wager by a player;

a secondary game controlled by the processor and operable upon an occurrence of a triggering event in a play of the primary game;

a plurality of sets in the secondary game, each set including a plurality of value components;

a plurality of different distinguished set identifiers, each set identifier associated with one of the sets, and each set having an associated set identifier;

a plurality of player selectable selections in the secondary game, said value components associated with said selections, said set identifiers associated with the selections, and wherein at least two different set identifiers are associated with one of the selections;

an input device operable to communicate with the processor and operable to enable the player to select the selections in the secondary game;

a display device controlled by the processor and operable to separately display each set; and an award adapted to be provided to the player, said award determined by the processor, wherein said processor is operable with the display device and the input device to:

(a) enable the player to pick a plurality of the selections, (b) display the value components and set identifiers associated with the picked selections, (c) display the value components of the picked selections in association with the separately displayed sets based on the set identifiers associated with said picked selections, and (d) determine the award based at least in part on the value components in a first of said sets which has all the value components of said set selected.

2. The gaming device of claim 1, which includes a modifier component associated with one of said selections, wherein the award is also based on said modifier if said selection is selected and is associated with the set identifier associated with the first of said sets which has the value components selected.

3. The gaming device of claim 2, wherein the modifier includes a multiplier.

4. The gaming device of claim 1, wherein the award is based on the value components in a plurality of the sets.

5. The gaming device of claim 1, wherein at least two different of the set identifiers are associated with at least one of the selections.

6. The gaming device of claim 1, wherein each of the value components is associated with at least one of the selections.

7. The gaming device of claim 6, wherein each of the selections is associated with at least one of the value components.

8. The gaming device of claim 1, wherein each of the selections is associated with at least one of the value components.

9. The gaming device of claim 1, wherein the different distinguished set identifiers have different shapes.

10. The gaming device of claim 1, wherein each set includes a different separate associated bonus modifier associated with said set.

* * * * *

UNITED STATES PATENT AND TRADEMARK OFFICE

CERTIFICATE OF CORRECTION

PATENT NO. : 7,517,281 B2
APPLICATION NO. : 10/949088
DATED : April 14, 2009
INVENTOR(S) : Anthony J. Baerlocher It is certified that error appears in the above-identified patent and that said Letters Patent is hereby corrected as shown below:

In Column 2, Line 65, change "having new apparatus and method for" to --having new apparatus and methods for--.

In Column 5, Lines 52-53, change "printed on a ticket or credited to a credit cards, debit cards or smart cards." to --printed on a ticket or credited to a credit card, debit card or smart card.--.

In Column 6, Line 64, change "the gaming the device 10" to --the gaming device 10--.

In Column 8, Line 46, change "The set value displays 116a and 116b displays the total" to --The set value displays 116a and 116b display the total--.

In Column 9, Lines 12-15, change "The number of picks needed to complete a game depends on the number of sets, the number of and the number of components in each set (including the components need to complete a set)." to --The number of picks needed to complete a game depends on the number of sets, the number of selections associated with each set and the number of components in each set (including the components needed to complete a set).--.

In Column 9, Lines 18-19, change "Each value component preferably has with a set indicator and a value." to --Each value component preferably has a set indicator and a value.--.

In Column 9, Line 32, change "set value display 11 6a shows" to --set value display 116a shows--.

In Column 9, Line 44, change "illustrates the player third selection" to --illustrates the player's third selection--.

UNITED STATES PATENT AND TRADEMARK OFFICE

CERTIFICATE OF CORRECTION

PATENT NO. : 7,517,281 B2
APPLICATION NO. : 10/949088
DATED : April 14, 2009
INVENTOR(S) : Anthony J. Baerlocher It is certified that error appears in the above-identified patent and that said Letters Patent is hereby corrected as shown below:

In Column 9, Line 45, change "the third selection 100J display a value" to --the third selection 100J displays a value--.

Signed and Sealed this

First Day of December, 2009

David J. Kappos

David J. Kappos
*Director of the United States Patent and Trademark Office*